(12) United States Patent
Singh et al.

(10) Patent No.: US 9,576,052 B2
(45) Date of Patent: Feb. 21, 2017

(54) SYSTEMS AND METHODS OF WEB CRAWLING

(71) Applicant: Xerox Corporation, Norwalk, CT (US)

(72) Inventors: Nidhi Singh, Meylan (FR); Jean-Marc Coursimault, Revel (FR); Herve Poirier, Meylan (FR); Nicolas Monet, Montbonnot-Saint-Martin (FR)

(73) Assignee: XEROX CORPORATION, Norwalk, CT (US)

( * ) Notice: Subject to any disclaimer, the term of this patent is extended or adjusted under 35 U.S.C. 154(b) by 274 days.

(21) Appl. No.: 13/942,812

(22) Filed: Jul. 16, 2013

(65) Prior Publication Data
US 2015/0026152 A1   Jan. 22, 2015

(51) Int. Cl.
*G06F 17/30* (2006.01)
(52) U.S. Cl.
CPC ............................... *G06F 17/30864* (2013.01)
(58) Field of Classification Search
CPC .................................................. G06F 17/30864
USPC ........................................................ 707/710
See application file for complete search history.

(56) References Cited

U.S. PATENT DOCUMENTS

| 7,433,895 | B2* | 10/2008 | Li et al. | |
|---|---|---|---|---|
| 8,744,171 | B1* | 6/2014 | Smith et al. | 382/159 |
| 2002/0194161 | A1* | 12/2002 | McNamee et al. | 707/2 |
| 2010/0293174 | A1* | 11/2010 | Bennett et al. | 707/759 |
| 2011/0246457 | A1* | 10/2011 | Dong et al. | 707/725 |
| 2012/0143792 | A1* | 6/2012 | Wang et al. | 706/12 |
| 2013/0091117 | A1* | 4/2013 | Minh | 707/709 |

* cited by examiner

*Primary Examiner* — Joshua Bullock

(57) ABSTRACT

Methods and systems for dynamically training a web crawler. The web crawler maintains one or more categories each comprising a set of words. The method includes selecting at least one hyperlink in response to a query received from a user. The method further includes determining a hyperlink score for the at least one hyperlink based on a category score associated with each of one or more categories. The category score associated with each of the one or more categories is updated based at least in part on the hyperlink score. The updated category score is compared with the hyperlink score to select a category from the one or more categories. The set of words associated with the category is updated based on content of a web page pointed by the at least one hyperlink.

14 Claims, 3 Drawing Sheets

SYSTEMS AND METHODS OF WEB CRAWLING

TECHNICAL FIELD

The presently disclosed embodiments are related, in general, to a web crawler. More particularly, the presently disclosed embodiments are related to systems and methods for training the web crawler.

BACKGROUND

Web crawler is an internet bot that browses through the World Wide Web (WWW) for indexing one or more web sites. Some of the web crawlers browse through websites having specific content (e.g., healthcare, technology, etc.). Such web crawlers are usually referred as focused web crawlers, or focused crawlers.

Typically, the focused web crawlers are trained on a sample or seed websites prior to browsing through the WWW. During actual crawling through the WWW, the focused web crawler utilizes the content learnt from the sample or seed websites to browse through the WWW. As the web crawler only utilizes the content learnt during the training phase, therefore the scope of browsing of the focused web crawler may be limited. This may lead to a decline in the efficiency of the overall crawling process.

SUMMARY

According to embodiments illustrated herein there is provided a method for dynamically training a web crawler. The web crawler maintains one or more categories each comprising a set of words. The method includes, in response to receiving a query from a user, selecting, by a processor, at least one hyperlink based on a set of words. The method further includes determining a hyperlink score, by the processor, for the at least one hyperlink based on a predetermined category score associated with each of one or more categories and a membership value of the at least one hyperlink for each of the one or more categories. The predetermined category score associated with each of the one or more categories is updated based at least in part on the hyperlink score by the processor. The updated predetermined category score is compared with the hyperlink score to select a category from the one or more categories by the processor. The set of words associated with the category is updated based on content of a web page pointed by the at least one hyperlink by the processor.

According to embodiments illustrated herein there is provided a system for dynamically training a web crawler. The web crawler maintains one or more categories each comprising a set of words. The system comprises one or more processors operable to select at least one hyperlink in response to a query received from a user based on the set of words. The one or more processors is further operable to determine a hyperlink score for the at least one hyperlink based on a predetermined category score associated with each of one or more categories and a membership value of the at least one hyperlink for each of the one or more categories. The one or more processors is further operable to update the predetermined category score associated with each of the one or more categories based at least in part on the hyperlink score. Additionally, the one or more processors are operable to compare the updated predetermined category score with the hyperlink score to select a category from the one or more categories. Further, the one or more processors are operable to update the set of words associated with the category based on content of a webpage pointed by the at least one hyperlink.

According to embodiments illustrated herein there is provided a computer program product for use with a computer. The computer program product comprises a non-transitory computer readable medium. The non-transitory computer readable medium stores a computer program code for dynamically training a web crawler. The web crawler maintains one or more categories each comprising a set of words. The computer program code is executable by a processor to select at least one hyperlink in response to a query received from a user based on the set of words. The computer program code is further executable by a processor to determine a hyperlink score for the at least one hyperlink based on a predetermined category score associated with each of one or more categories and a membership value of the at least one hyperlink for each of the one or more categories. The computer program code is executable by a processor to update the predetermined category score associated with each of the one or more categories based at least in part on the hyperlink score. Additionally, the computer program code is executable by a processor to compare the updated predetermined category score with the hyperlink score to select a category from the one or more categories. Finally, the computer program code is executable by a processor to update the set of words associated with the category based on content of a webpage pointed by the at least one hyperlink.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit, the scope in any manner, wherein like designations denote similar elements, and in which.

DETAILED DESCRIPTION

Figure 1:
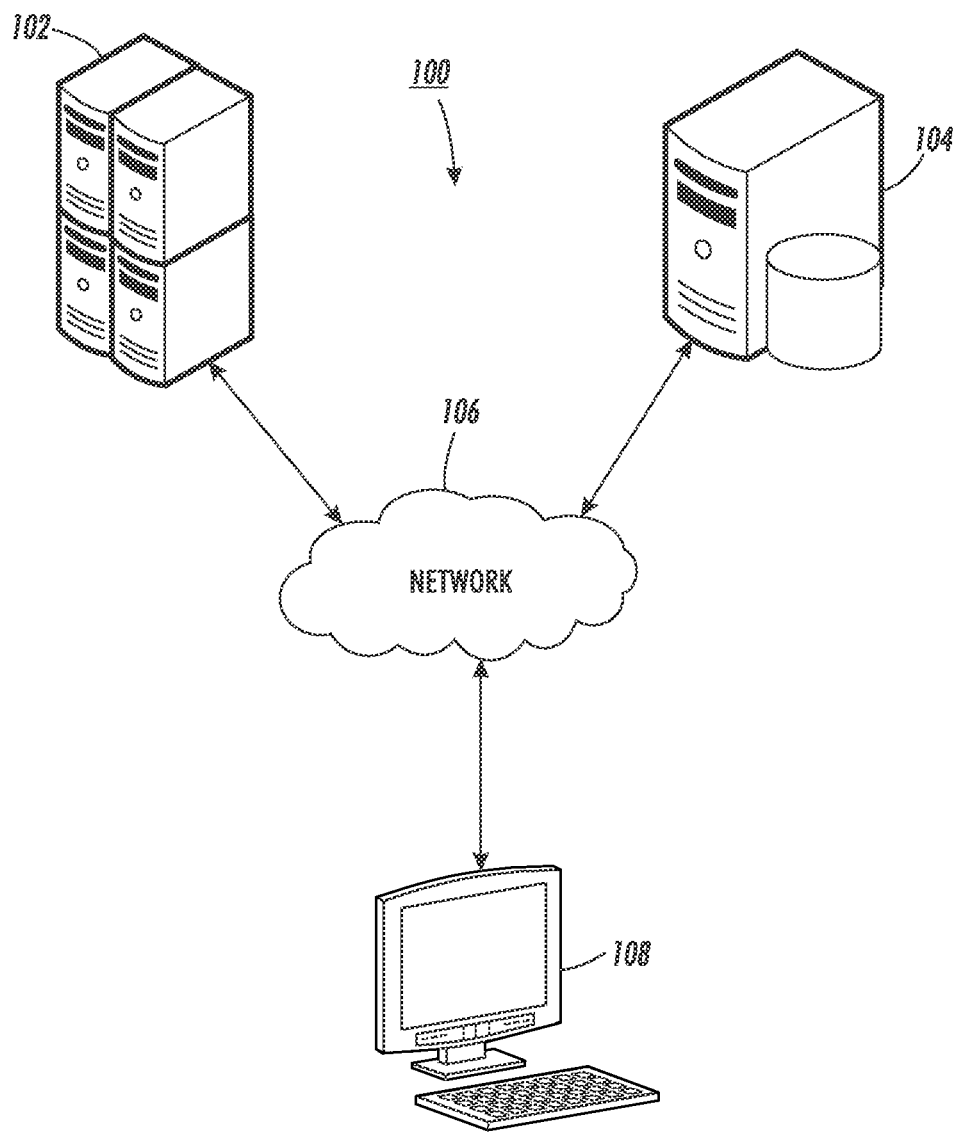
FIG. 1 is a block diagram illustrating a system environment in which various embodiments can be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "at least one embodiment", "an embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions: The following terms shall have, for the purposes of this application, the respective meanings set forth below.

A "web crawler" refers to an internet bot that browses through WWW for purpose of at least indexing one or more websites, validating html code, and web scarping. Some example of commonly known web crawlers may include, but are not limited to, focused crawler, path-ascending crawler, an academic-focused crawler, etc.

A "hyperlink" corresponds to a reference to data that a reader can follow. In one example, a hyperlink may correspond to a link to a website. In an embodiment, the hyperlink may include text content commonly referred as hypertext. Further, the hyperlink includes an anchor that is representative of a location the data.

A "Hyperlink score" refers to a measure of relevancy of a hyperlink to a semantic. For example, two hyperlinks for a semantic "healthcare" possess the hyperlink score of 0.8 and 0.4. The hyperlink that has the hyperlink score of 0.8 is more relevant to the semantic "healthcare" in comparison to the hyperlink having a score of 0.4.

A "category score" refers to a score associated with one or more categories corresponding to a semantic. In an embodiment, the category score is indicative of relevancy of a category to the semantic. In an embodiment, the category score is further indicative of relevancy of a set of words contained in the category to the semantic.

A "first reward score" refers to a measure of correctness of a decision to select a hyperlink as being relevant to a semantic.

A "contribution score" refers to a measure of contribution of each of the one or more categories in selecting a hyperlink.

A "second reward score" refers to a set of points allotted to the one or more categories based on respective contribution scores associated with each of the one or more categories.

FIG. 1 is a block diagram illustrating a system environment 100 in which various embodiments can be implemented. The system environment 100 includes a web crawler server 102, a database server 104, a network 106, and a user computing device 108.

The web crawler server 102 receives a query from a user of the user computing device 108. The web crawler server 102 determines semantics of the query. Based on the semantics of the query, the web crawler server 102 browses through one or more websites. In an embodiment, the content of the one or more websites is relevant to the semantics of the query. The web crawler server 102 maintains one or more categories, where each of the one or more categories includes a set of words. While browsing through the one or more websites, the web crawler server 102 updates the set of words based on the content of the one or more websites. The operation of the web crawler server 102 has been described later in conjunction with FIG. 2. The web crawler server 102 may be realized through an application server such as but not limited to, Java application server, .NET framework, and Base4 application server.

The database server 104 stores the set of words pertaining to the one or more categories. In an embodiment, the database server 104 may receive a query from the web crawler server 102 to retrieve the set of words. The database server 104 may be realized through various technologies, such as, but not limited to, Microsoft® SQL server, Oracle, and My SQL. In an embodiment, the web crawler server 102 may connect to the database server 104 using one or more protocols such as, but not limited to, ODBC protocol and JDBC protocol.

A person having ordinary skills in the art would understand that the scope of the disclosure should not be limited to the database server 104 as a separate entity. In an embodiment, the functionality of the database server 104 may be implemented in the web crawler server 102.

The network 106 corresponds to a medium through which content and messages flow between various devices of the system environment 100 (e.g., the web crawler server 102, the database server 104, and the user computing device 108). Examples of the network 106 may include, but are not limited to, a Wireless Fidelity (Wi-Fi) network, a Wireless Area Network (WAN), a Local Area Network (LAN) or a Metropolitan Area Network (MAN). Various devices in the system environment 100 can connect to the network 106 in accordance with the various wired and wireless communication protocols such as Transmission Control Protocol and Internet Protocol (TCP/IP), User Datagram Protocol (UDP), and 2G, 3G, or 4G communication protocols.

The user computing device 108 transmits the query to the web crawler server 102 for retrieving the one or more websites that are related to the semantics of the query. Some of the examples of the user computing device 108 include a personal computer, a laptop, a PDA, a mobile device, a tablet, or any device that has the capability to transmit the query to the web crawler server 102.

Figure 2:
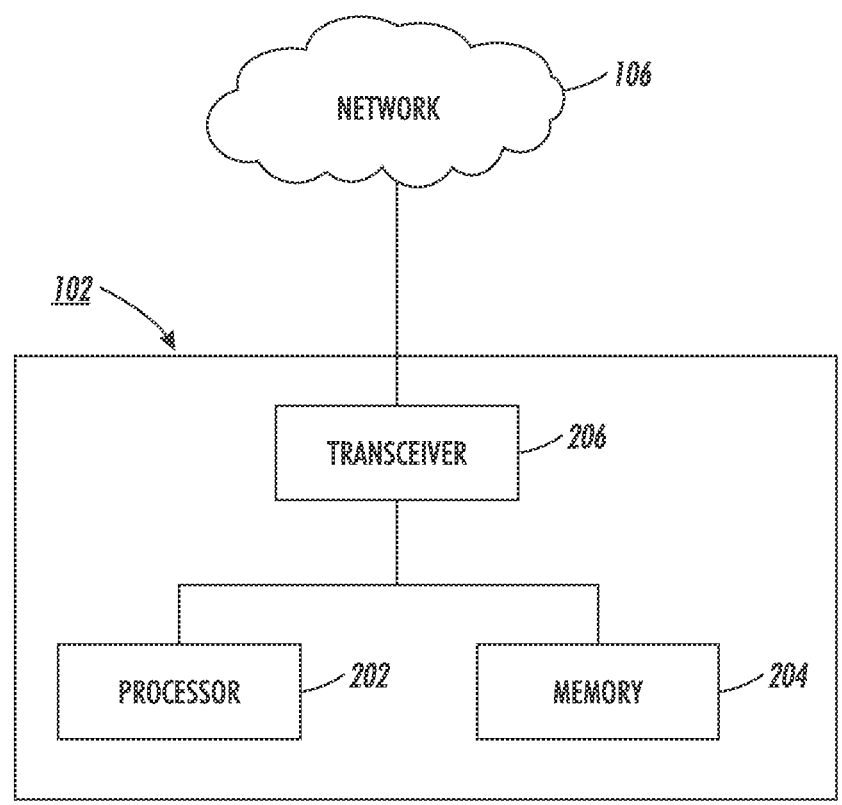
FIG. 2 is a block diagram illustrating a web crawler, in accordance with at least one embodiment.

FIG. 2 is a block diagram of the web crawler server 102, in accordance with at least one embodiment. The web crawler server 102 includes a processor 202, a memory 204, and a transceiver 206. The web crawler server 102 is described in conjunction with FIG. 1.

The processor 202 is coupled to the memory 204 and the transceiver 206. The transceiver 206 is connected to the network 106.

The processor 202 includes suitable logic, circuitry, and/or interfaces is operable to execute one or more instructions stored in the memory 204 to perform predetermined operation on the web crawler server 102. The memory 204 may be operable to store the one or more instructions. The processor 202 may be implemented using one or more processor technologies known in the art. Examples of the processor 202 include, but not limited to, an X86 processor, a RISC processor, an ASIC processor, a CISC processor, or any other processor.

The memory 204 stores a set of instructions and data. Some of the commonly known memory implementations include, but are not limited to, a random access memory (RAM), a read only memory (ROM), a hard disk drive (HDD), and a secure digital (SD) card. Further, the memory 204 includes the one or more instructions that are executable by the processor 202 to perform specific operations. It is apparent to a person having ordinary skills in the art that the one or more instructions stored in the memory 204 enable the hardware of the web crawler server 102 to perform the predetermined operation.

The transceiver 206 transmits and receives messages and data to/from various components of the system environment 100 (e.g., the web crawler server 102 and the database server 104). Examples of the transceiver 206 may include, but are not limited to, an antenna, an Ethernet port, a USB port or any other port that can be configured to receive and transmit data. The transceiver 206 transmits and receives data/messages in accordance with the various communication protocols, such as, TCP/IP, UDP, and 2G, 3G, or 4G communication protocols.

In operation, the processor 202 is operable to receive the query from the user computing device 108 through the transceiver 206. Prior to receiving the query, the processor 202 trains the web crawler server 102 using a sample data.

In order to train the web crawler server 102, the processor 202 extracts the sample data from the memory 204. In an embodiment, the sample data includes a set of seed hyperlinks and corresponding hyperlink scores. Based on the hyperlink scores associated with each hyperlink in the set of seed hyperlinks, the processor 202 determines the range of hyperlinks scores. Further, the processor 202 divides the range of hyperlink scores in one or more sub-ranges of the hyperlink scores. Each of the one or more sub ranges of the hyperlink scores corresponds to a category. Based on the hyperlink scores associated with the set of seed hyperlinks and a sub-range of hyperlink scores associated with one or more categories, the processor 202 categorizes each of the set of seed hyperlinks in the one or more categories. For example, the set of seed hyperlink includes four hyperlinks having the hyperlink scores of 0.2, 0.4, 0.6, and 0.8. The processor 202 may divide the hyperlink score range (i.e., 0.2-0.8) into a first sub-range (i.e., 0.2-0.5) and a second sub-range (i.e., 0.5-0.8). The first sub-range and the second sub-range correspond to a first category and a second category. The processor 202 categorizes the hyperlinks having score of 0.2 and 0.4 under the first category and the hyperlinks having score of 0.6 and 0.8 under the second category.

For each of the one or more categories, the processor 202 determines a category score based on the hyperlink scores of the hyperlinks categorized in the each of the one or more categories. In an embodiment, the processor 202 utilizes following equation to determine the category score:

$$Q(P_i) = \frac{1}{P_i} \sum_{u \in P_i} Q(u) \quad (1)$$

where,

Q ($P_i$) : Category score of $i^{th}$ category; and

Q(u): Hyperlink score of hyperlink categorized under $i^{th}$ category.

Post determining the category scores, the processor 202 categorizes words from the web page/hypertext pointed by the set of seed hyperlinks in respective categories such that each of the one or more categories includes a set of words. In an embodiment, the web crawler server 102 utilizes the set of words to select new hyperlinks. In an embodiment, the processor 202 may utilize one or more parsing techniques such as top-down parsing, and bottom-up parsing to extract the words from the web pages.

Similarly, the processor 202 trains the web crawler server 102 by creating the one or more categories for multiple topics. For example, the processor 202 creates the one or more categories and maintains associated hyperlinks as the set of seed hyperlinks for a topic "healthcare". In another example, the processor 202 creates the one or more categories and maintains associated hyperlinks as the set of seed hyperlinks for topic "electronics".

Post training of the web crawler server 102, the processor 202 receives the query from the user computing device 108 through the transceiver 206. The processor 202 may determine the semantics of the query using one or more techniques such as RDF path traversal, keyword to concept mapping, graph patterns, and fuzzy logic. Based on the semantics, the processor 202 determines whether the web crawler server 102 has been trained on the determine semantics. If it is determined that the web crawler server 102 has been trained on the determined semantics, the processor 202 extracts the set of seed hyperlinks and the set of words pertaining to the one or more categories associated with the determined semantics from the memory 204.

For example, the processor 202 receives the query "medicines" from the user computing device 108. The processor 202 identifies the semantics of the query to determine that the query relates to the topic "healthcare". Thereafter, the processor 202 extracts the set of seed hyperlinks pertaining to the topic "healthcare". Further, the processor 202 extracts the set of words pertaining to the one or more categories associated with the determined semantics (i.e., "healthcare").

The processor 202 is operable to browse through the one or more seed hyperlinks and the websites pointed by the one or more seed hyperlinks. While browsing through the one or more websites, the processor 202 may encounter a new hyperlink in one of the websites pointed by the one or more seed hyperlinks. In such a scenario, the processor 202 analyzes the hypertext in the hyperlink to determine whether the hyperlink is relevant. In an embodiment, the processor 202 compares the hypertext with the set of words in the one or more categories (extracted by the processor 202 for the determined semantics). Based on the comparison, the processor 202 determines a membership value of the hyperlink in the one or more categories. Further, the processor 202 assigns a hyperlink value to the new hyperlink using the following equation:

$$Q(u) = \Sigma_{P_i \in P} Q(P_i) * (P_i | u) \quad (2)$$

where, p($P_i$|u): Membership value of the new hyperlink in each of the one or more categories.

Thereafter, the processor 202 determines whether the hyperlink score of the new hyperlink is greater than a predetermined threshold. In an embodiment, the hyperlink score is indicative of relevancy of the new hyperlink to the determined semantic. If the hyperlink score is greater than the predetermined threshold, the processor 202 downloads the webpage pointed by the new hyperlink. The processor 202 analyzes the content of the webpage to determine whether the content of the webpage is relevant. In an embodiment, the content of the webpage include, but are not limited to, anchor, header, and title of the webpage. Based on the determination of the relevancy of the content of the webpage, the processor 202 assigns a first reward score to the new hyperlink using the following equation:

$$r(u) = F * (1 + \Theta(u)) \quad (3)$$

where, r(u): First reward score allocated to the new hyperlink;

F: Scaling value; and

Θ(u): Relevancy score of the hyperlink ("0" if not relevant; "1" if relevant).

Since the new hyperlink is selected based on the hyperlink score and the hyperlink score is determined based on the category score, the processor 202 determines a contribution score of each of the one or more categories in selection of the new hyperlink. In an embodiment, the processor 202 utilizes following equation to determine the contribution score:

$$\delta(P_i, u) = \frac{Q(P_i) * p(P_i | u)}{Q(u)} \quad (4)$$

where, $\delta(P_i, u)$: Contribution score.

Based on the contribution score, the processor 202 determines a second reward score for each of the one or more categories. In an embodiment, the processor 202 utilizes following equation to determine the second reward score:

$$\phi(P_i, u) = \delta(P_i, u) * r(u) \quad (5)$$

The processor 202 updates the category score for each of the one or more categories based on the second reward score. In an embodiment, the processor 202 utilizes the following equation to update the category score:

$$Q(P_i) \leftarrow Q(P_i) + \lambda(\Sigma_{u \in \epsilon} \phi(P_i, u) - \gamma * Q(P_i)) \quad (6)$$

where,

λ: Learning rate, where λ lies between 0 and 1; and
γ: Discount factor, where γ lies between 0 and 1.

Similarly, the processor 202 updates the hyperlink score of the new hyperlink by utilizing the following equation:

$$Q(u) = Q(u) + \lambda'(\Sigma_{u \in \epsilon} r(u) - \gamma'^* Q(u)) \quad (7)$$

where,

λ': Learning rate, where λ' lies between 0 and 1; and
γ': Discount factor, where γ' lies between 0 and 1.

Additionally, the processor 202 is operable to update the set of words contained in a category from the one or more categories. The processor 202 identifies the category based on the updated hyperlink score associated with the new hyperlink and the updated category score of each of the one or more categories. In an embodiment, a category having the updated category score closest to the updated hyperlink score of the new hyperlink is selected for updation of the set of words. In an embodiment, the processor 202 utilizes following equation to select the category:

$$P' = \arg\min |Q'(u) - Q(P_i)| \quad (8)$$

For example, the one or more categories include three categories having updated category score as 0.2, 0.8, and 0.9. Further, the updated hyperlink score for the new hyperlink is 0.7. The processor 202 utilizes the equation 8 to select the category having the updated category score as 0.8 for the updation of the set of words.

Post selection of the category, the processor 202 updates the set of words contained in the selected category. In an embodiment, the processor 202 selects a second set of words from the website pointed by the new hyperlink for updating the set of words in the selected category. In an embodiment, conditional probability of the second set of words belonging to the selected category is high in comparison to the rest of words in the website.

In an alternate embodiment, the processor 202 selects only those words from the website that are not present in the set of words contained in the selected category.

A person skilled in the art would understand that scope of the disclosure is not limited to updating the set of words contained in the category. In an embodiment, the one or more features of the website (pointed by the hyperlink) or the new hyperlink can be used for updating the selected category.

Figure 3:
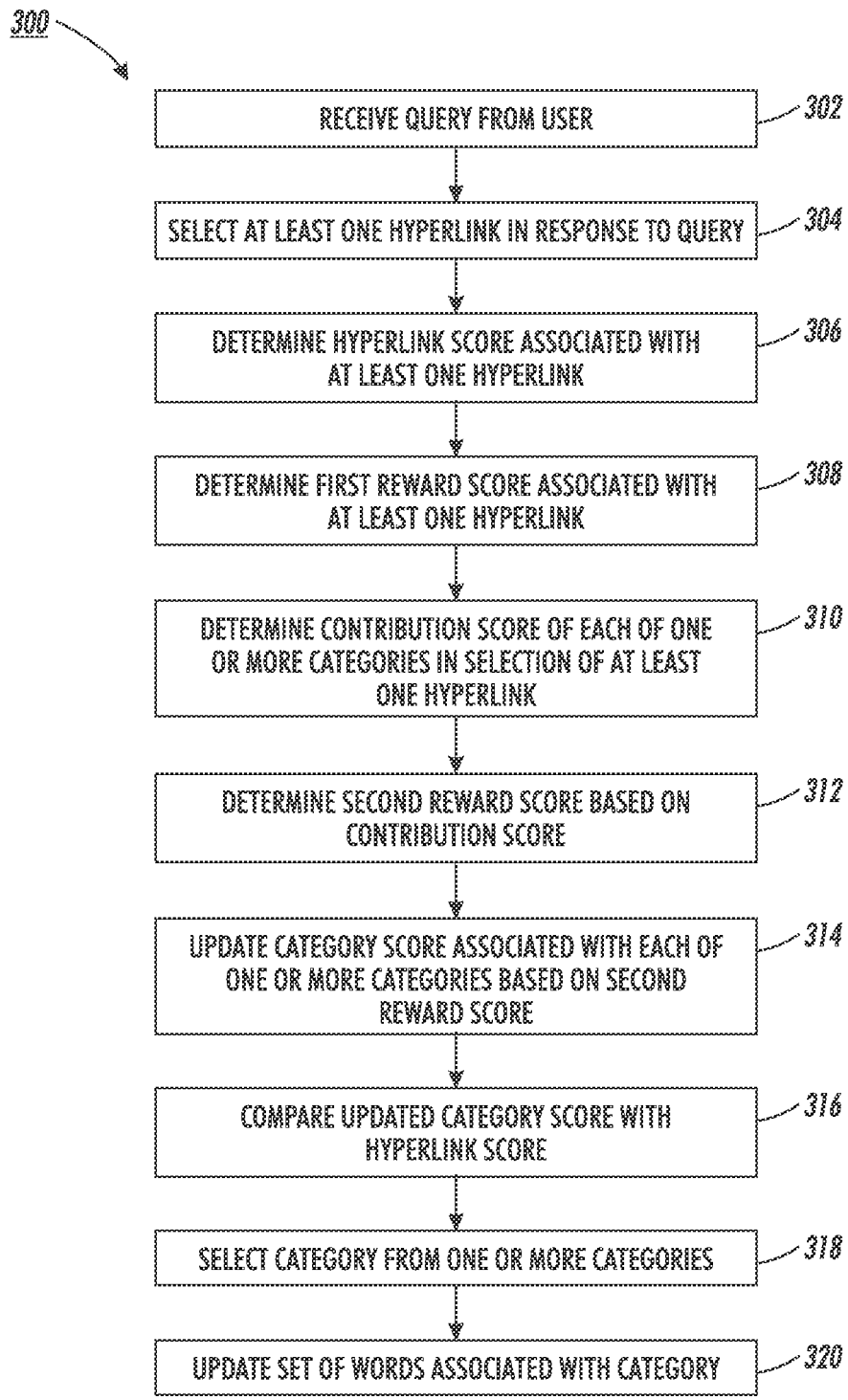
FIG. 3 is a flowchart illustrating a method for training a web crawler, in accordance with at least one embodiment.

FIG. 3 is a flowchart 300 illustrating a method for training a web crawler, in accordance with at least one embodiment. The flowchart 300 is described in conjunction with FIG. 1 and FIG. 2.

At step 302, the query is received from the user. In an embodiment, the processor 202 receives the query from the user computing device 108. The processor 202 selects the set of seed hyperlinks in accordance to semantics of the query. At step 304, the hyperlink is selected. At step 306, the hyperlink score for the selected hyperlink is determined. At step 308, the first reward score is determined for the selected hyperlink based on the hyperlink score. At step 310, the contribution score of each of the one or more categories in selection of the selected hyperlink is determined. At step 312, the second reward score for each of the one or more categories is determined based on the contribution score. At step 314, the category score for each of the one or more categories is updated based on the second reward score. At step 316, the updated category score is compared with the hyperlink score associated with the selected hyperlink. At step 318, the category is selected from the one or more categories based on the comparison. At step 320, the set of words contained in the selected category is updated.

The disclosed embodiments encompass numerous advantages. The web crawler server 102 is trained on the sample data. While training the web crawler server 102, the web crawler server 102 maintains the one or more categories containing the set of words that is used for selecting the new hyperlink. While crawling through the new hyperlinks, the web crawler server 102 updates the set of words in the one or more categories. Updating the set of words leads to more robust web crawler server 102 that may select new hyperlinks that may not have been selected by the conventional web crawler server.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, and the like. The storage device may also be a means for loading computer programs or other instructions into the computer system. The computer system also includes a communication unit. The communication unit allows the computer to connect to other databases and the Internet through an input/output (I/O) interface, allowing the transfer as well as reception of data from other sources. The communication unit may include a modem, an Ethernet card, or other similar devices, which enable the computer system to connect to databases and networks, such as, LAN, MAN, WAN, and the Internet. The computer system facilitates input from a user through input devices accessible to the system through an I/O interface.

In order to process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for adjusting compensation for tasks have been disclosed. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, or the like.

The claims can encompass embodiments for hardware, software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for training a web crawler, wherein the web crawler maintains one or more categories each comprising a set of words, the method comprising:
in response to receiving a query from a user:
selecting, by a processor, at least one hyperlink based on the set of words;
determining, by the processor, a hyperlink score for the at least one hyperlink based on a predetermined category score associated with each of one or more categories and a membership value of the at least one hyperlink for each of the one or more categories;
updating, by the processor, the predetermined category score associated with each of the one or more categories based at least on a discount factor associated with the predetermined category score and an association of learning rate with a measure of contribution of the one or more categories for the selection of the at least one hyperlink and another measure of correctness of the selection of the at least one hyperlink with respect to semantic of the query;
comparing, by the processor, the updated predetermined category score with the hyperlink score to select a category from the one or more categories; and
updating, by the processor, the set of words associated with the category based on content of a web page pointed by the at least one hyperlink.

2. The method of claim 1 further comprising determining, by the processor, a first reward score for the at least one hyperlink based on a predetermined scaling value and a relevancy score of the at least one hyperlink, wherein the relevancy score is determined based on semantics of the query.

3. The method of claim 2 further comprising determining, by the processor, a contribution score of each of the one or more categories based on the hyperlink score, the predetermined category score, and the membership value, wherein the contribution score is indicative of contribution of each of the one or more categories in selection of the at least one hyperlink.

4. The method of claim 3 further comprising determining, by the processor, a second reward score for each of the one or more categories based on the contribution score and the first reward score.

5. The method of claim 4, wherein the predetermined category score is updated based on the second reward score.

6. The method of claim 2 further comprising updating, by the processor, the hyperlink score based on the first reward score.

7. A system for training a web crawler, wherein the web crawler maintains one or more categories each comprising a set of words, the system comprises:

one or more processors operable to execute one or more instructions to:
- select at least one hyperlink in response to a query received from a user based on the set of words;
- determine a hyperlink score for the at least one hyperlink based on a predetermined category score associated with each of one or more categories and a membership value of the at least one hyperlink for each of the one or more categories;
- update the predetermined category score associated with each of the one or more categories based at least on a discount factor associated with the predetermined category score and an association of learning rate with a measure of contribution of the one or more categories for the selection of the at least one hyperlink and another measure of correctness of the selection of the at least one hyperlink with respect to semantic of the query;
- compare the updated predetermined category score with the hyperlink score to select a category from the one or more categories; and
- update the set of words associated with the category based on content of a webpage pointed by the at least one hyperlink.

8. The system of claim 7, wherein the one or more processors is further operable to execute the one or more instructions to determine a first reward score for the at least one hyperlink based on a predetermined scaling value and a relevancy score of the at least one hyperlink, wherein the relevancy score is determined based on semantics of the query.

9. The system of claim 8, wherein the one or more processors is further operable to execute the one or more instructions to determine a contribution score of each of the one or more categories based on the hyperlink score, the predetermined category score, and the membership value, wherein the contribution score is indicative of contribution of each of the one or more categories in selection of the at least one hyperlink.

10. The system of claim 9, wherein the one or more processors is further operable to execute the one or more instructions to determine a second reward score for each of the one or more categories based on the contribution score and the first reward score.

11. The system of claim 10, wherein the predetermined category score is updated based on the second reward score.

12. The system of claim 8, wherein the one or more processors is further operable to execute the one or more instructions to update the hyperlink score based on the first reward score.

13. The system of claim 7, wherein the content of the webpage comprises one or more of an anchor, a header, and a page title of a web page.

14. A computer program product for use with a computer, the computer program product comprising a non-transitory computer readable medium, the non-transitory computer readable medium stores a computer program code for training a web crawler, wherein the web crawler maintains one or more categories each comprising a set of words, the computer program code is executable by a processor to:
- select at least one hyperlink in response to a query received from a user based on the set of words;
- determine a hyperlink score for the at least one hyperlink based on a predetermined category score associated with each of one or more categories and a membership value of the at least one hyperlink for each of the one or more categories;
- update the predetermined category score associated with each of the one or more categories based at least on a discount factor associated with the predetermined category score and an association of learning rate with a measure of contribution of the one or more categories for the selection of the at least one hyperlink and another measure of correctness of the selection of the at least one hyperlink with respect to semantic of the query;
- compare the updated predetermined category score with the hyperlink score to select a category from the one or more categories; and
- update the set of words associated with the category based on content of a webpage pointed by the at least one hyperlink.

* * * * *